L. J. F. STUART.
GRAPPLE.
APPLICATION FILED APR. 9, 1910.
993,905.
Patented May 30, 1911.
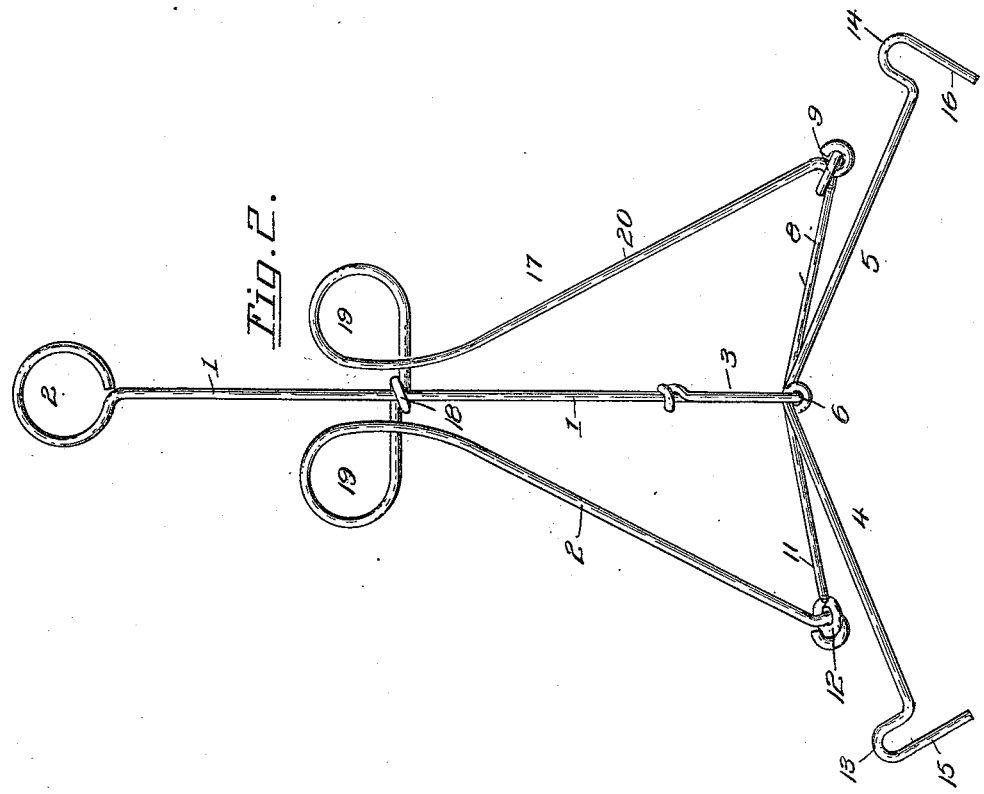
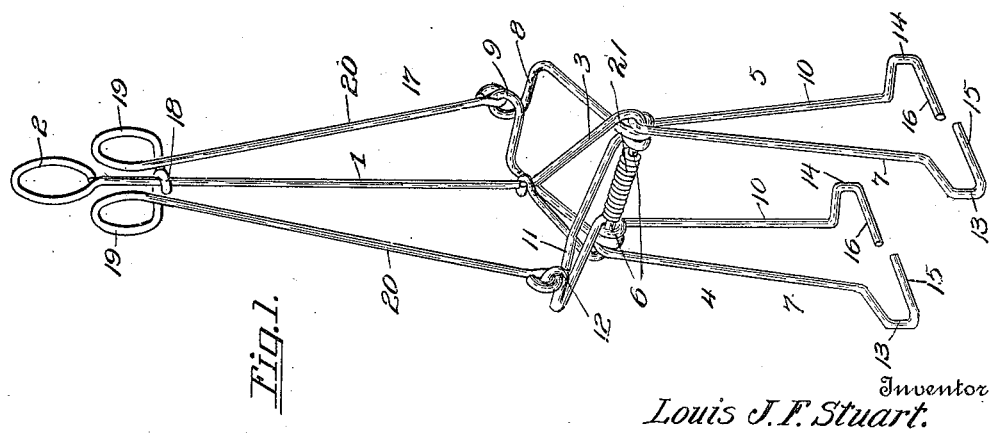
Witnesses
F. C. Gibson.
James A. Koehl
Inventor
Louis J. F. Stuart.
By Victor J. Evans
Attorney

UNITED STATES PATENT OFFICE.

LOUIS J. F. STUART, OF BRIDGEPORT, CONNECTICUT.

GRAPPLE.

993,905. Specification of Letters Patent. Patented May 30, 1911.

Application filed April 9, 1910. Serial No. 554,539.

*To all whom it may concern:*

Be it known that I, LOUIS J. F. STUART, a citizen of the United States of America, residing at Bridgeport, in the county of Fairfield and State of Connecticut, have invented new and useful Improvements in Grapples, of which the following is a specification.

This invention relates to grapples, and it has for an object to provide a device of this character which may be formed entirely of suitable gage wire formed to provide companion gripping jaws, a handle member and an actuating member movable on the handle and operatively connected with the jaw members to move them and operable to normally hold the jaw members in their closed positions.

In the drawing, forming a portion of this specification and in which like numerals of reference indicate similar parts in the several views: Figure 1 is a detail perspective view of my improved grapple showing the jaws in their closed positions. Fig. 2 is a side view showing the jaws of the grapple in their open positions.

My improved grapple consists of a handle member 1 which is formed at one end to provide an eye 2 and at the opposite end the member is formed to provide a substantially triangular head 3. Companion jaw members 4 and 5 are employed and as illustrated, each jaw member is formed from a single length of wire which is coiled about the portion 6 of the head 3 so as to permit movements of the jaw members toward and away from each other. The jaw member 4 is formed to provide spaced arms 7 and a bail 8 having an eye 9 for a purpose to be hereinafter described. The jaw member 5 is formed to provide spaced arms 10 and a bail 11 which is also formed to provide an eye 12 which is similar to the eye 9 in the bail 8. The arms 7 are formed to provide hooked extremities 13 and the arms 10 are formed to provide similar hooked extremities 14, the bills 15 of the latter being arranged immediately above the bills 16 of the former, as shown, when the jaws are in their closed positions they will present effective gripping means when the jaws are engaged with the object to be handled.

An actuating member 17 is formed from a single length of spring wire bent to form an eye 18 which is slidable on the handle 1. This actuating member is formed to provide finger-holds 19 and the terminals of the said actuating member are formed to provide outwardly diverging arms 20 which are pivotally connected with the eyes 9 and 12 respectively on the bails of the hereinbefore described gripping jaws. Incident to the fact that the actuating member is formed of spring wire, the arms 20 normally exert their tension to hold the gripping jaws in their closed positions.

The device described is especially designed for use as an implement for handling live crabs, lobsters or the like, but it is obvious that its uses are unlimited and further detail explanation is believed to be unwarranted. The portion 6 of the head 3 is provided with a spacing washer 21 which is formed preferably from a single length of wire coiled about the portion 6 and confined between the intermediate coiled portions of the gripping jaws. It may be stated that the gripping jaws, handle member and the actuating member are formed from the same gage wire preferably but I do not desire to be limited in this respect as it is obvious that any well known jaw members may be operatively connected with the remaining elements of the structure disclosed producing equally advantageous results.

I claim:—

A grapple comprising a handle member formed at one end to provide an eye and at its opposite end to provide a substantially triangular head, companion jaw members each formed from a single length of material formed to provide spaced side arms and a connecting loop, the intermediate portions of the arms being pivotally mounted on the triangular head of the handle, the said arms having hooked extremities, and an actuating member formed from a single length of spring wire bent upon itself to form oppositely extending spring arms whose extremities are connected with the looped portions of the jaw members, the intermediate portion of the said actuating member being formed to provide a guide eye which slidably receives the handle and being formed immediately adjacent the guide eye to provide manipulating eyes, the spring action of the actuating member operating to normally hold the jaw members closed against each other and to hold the actuating eyes immediately adjacent the eye of the handle.

In testimony whereof I affix my signature in presence of two witnesses.

LOUIS J. F. STUART. [L. S.]

Witnesses:
FREDERICK C. FILLEY,
JOHN NELSON.

Copies of this patent may be obtained for five cents each, by addressing the "Commissioner of Patents, Washington, D. C."